United States Patent
Burchardt et al.

(10) Patent No.: US 11,868,107 B2
(45) Date of Patent: Jan. 9, 2024

(54) METHOD FOR TRANSMITTING DATA IN A CONTROL SYSTEM OF A MACHINE

(71) Applicant: Robert Bosch GmbH, Stuttgart (DE)

(72) Inventors: Gunter Burchardt, Steinfeld-Hausen (DE); Johannes Albrecht, Partenstein (DE); Matthias Kleinfeller, Lohr-Lindig (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 16/940,437

(22) Filed: Jul. 28, 2020

(65) Prior Publication Data
US 2021/0055704 A1    Feb. 25, 2021

(30) Foreign Application Priority Data
Aug. 21, 2019  (DE) .................. 10 2019 212 468.2

(51) Int. Cl.
*G05B 19/042*    (2006.01)

(52) U.S. Cl.
CPC .. *G05B 19/042* (2013.01); *G05B 2219/25131* (2013.01)

(58) Field of Classification Search
USPC .......................................................... 700/28
See application file for complete search history.

(56) References Cited

U.S. PATENT DOCUMENTS

| 5,913,037 A | * | 6/1999 | Spofford | H04L 41/0213 709/224 |
| 2003/0097438 A1 | * | 5/2003 | Bearden | H04L 43/091 709/224 |
| 2010/0125683 A1 | * | 5/2010 | Soeda | G06F 11/3466 710/19 |

OTHER PUBLICATIONS openmaniak.com "OpenVPN—the easy tutorial introduction" (2011) retrieved from https://web.archive.org/web/20111222174731/http://openmaniak.com:80/openvpn.php (Year: 2011).*
Steffen et al., Design and Realization of an IP-based In-car Network Architecture, ISVCS 2008, Jul. 22-24, 2008, Dublin, Ireland. Copyright 2008 ISBN # 978-963-9799-27-1 (Year: 2008).*

* cited by examiner

*Primary Examiner* — Mohammad Ali
*Assistant Examiner* — Joshua T Sanders
(74) *Attorney, Agent, or Firm* — Maginot, Moore & Beck LLP

(57) ABSTRACT

The disclosure relates to a method for transmitting data in a control system of a machine, wherein the control system comprises a mediator unit, at least one client unit and at least one provider unit, wherein the mediator unit is respectively connected to the at least one client unit and to the at least one provider unit in a data-transmitting manner, wherein access paths to data stored in the at least one provider unit are stored in the mediator unit, wherein, in order to transmit data between a transmitting client unit of the at least one client unit and a receiver provider unit of the at least one provider unit, a message transmitted from the transmitting client unit is received by the mediator unit and is transmitted to the receiver provider unit on the basis of the stored access paths.

11 Claims, 3 Drawing Sheets

METHOD FOR TRANSMITTING DATA IN A CONTROL SYSTEM OF A MACHINE

This application claims priority under 35 U.S.C. § 119 to application no. DE 10 2019 212 468.2, filed on Aug. 21, 2019 in Germany, the disclosure of which is incorporated herein by reference in its entirety.

TECHNICAL FIELD

The present disclosure relates to a method for transmitting data in a control system of a machine and to a control system of a machine.

BACKGROUND

In the present context, industrial machines or machines in an industrial context shall be understood as meaning, in particular, units or a system of different units for carrying out a technical process, in particular a regulating and/or control process. In this case, the machine is, in particular, in the form of an apparatus for converting energy or force, and a system comprising a plurality of such machines may be provided as an installation.

In conventional control systems of such machines, machine-related data are usually defined in advance by a manufacturer. The range of functions of a control system is usually already determined during an early design or production phase and is defined by means of the corresponding machine-related data stored in the control system. A subsequent change to the data, in particular a dynamic change at the runtime of the machine, is usually not readily possible. Typical control systems have so-called programmable logic controllers (PLC), CNC controllers, numerical controllers (NC) and the like.

SUMMARY

The disclosure proposes a method for transmitting data in a control system of a machine and a control system of a machine. The following description relate to advantageous configurations.

The control system comprises a mediator unit, at least one client unit (or request unit, data processor) and at least one provider unit (or provision unit, data node—source and/or sink). The mediator unit is respectively connected to the at least one client unit and to the at least one provider unit in a data-transmitting manner. The mediator, client and provider units can each be implemented as executed software or as a hardware unit, for example.

Access paths to data stored in the at least one provider unit are stored or registered in the mediator unit. In particular, data or machine-related data which expediently describe a range of functions of the control system or which can be used to perform functions of the control system, in particular, are respectively stored in the individual provider units. The individual data can be expediently uniquely addressed with the aid of the access paths.

In order to transmit data between a particular transmitting client unit and a particular receiver provider unit, a message transmitted from the transmitting client unit is received by the mediator unit. On the basis of the stored access paths, this message is transmitted from the mediator unit to the receiver provider unit. The mediator unit is therefore expediently provided and configured to manage and mediate data or message transmissions between the client units and the provider units.

The client units can therefore expediently submit requests in the form of corresponding messages to the mediator unit in order to access special data stored in the provider units, for example in order to read and/or write or change said data. The mediator unit can forward the requests or messages to the respective receiver provider unit by means of the registered or stored access paths. The respective transmitting client unit can introduce new data into the control system or into the respective receiver provider unit, for example, via the corresponding message. For example, the data stored in the receiver provider unit can be updated, expanded or replaced by means of the corresponding message. Furthermore, a request to read in the special data from the receiver provider unit can also be submitted by the transmitting client unit by means of the corresponding message, for example.

Within the scope of the present method, a hierarchically distributed architecture of the control system comprising client unit(s), mediator unit and provider unit(s) is therefore provided, wherein the mediator unit is expediently provided as a central management unit between the client and provider unit(s). The mediator unit expediently manages and mediates operations by the client unit(s) to access the machine-related data stored in the provider units, with the result that the machine-related data can be accessed in a dynamic and flexible manner, in particular even during the runtime of the control system. In particular, new data can be dynamically introduced into the provider units in this manner during the runtime of the control system, as a result of which the control system can be expanded with functionalities, configured and operated, in particular at the runtime.

In order to simplify the addressing and routing of the data, provision is made, in particular, whenever a message is transmitted from one unit to another unit, for connection information relating to a connection between the one unit and the other unit to be stored in the message. Therefore, when transmitting a data request, the path for the response is generated at the same time and is stored in the message. In particular, the connection information contains the respective address of the unit which is currently sending or transmitting and then becomes a receiving unit in the return path.

As a result, all information or routing information for a return direction, that is to say for a potential response to the message, is included in the message itself. If a response to the message is intended to be transmitted by the receiver unit, information relating to the connections which are intended to be used to transmit the response back to the transmitting client unit is stored in the message itself. This connection information need not be stored in any unit involved. Resources can be expediently saved.

According to one particularly advantageous embodiment, if the message is transmitted from the transmitting client unit to the mediator unit, first connection information relating to a connection between the transmitting client unit and the mediator unit is stored in the message. The same preferably applies—mutatis mutandis—to second connection information relating to a connection between the mediator unit and the receiver provider unit.

The connection information may be, in particular, addresses. If the message is therefore transmitted from one unit to the next in the control system, an item of connection information relating to the connection used to transmit the message is added to the message. In particular, each of these items of connection information is prepended, that is to say connection information relating to the respective current transmission is stored as a most significant connection information entry in the message.

In particular, the connection information is stored in the message by the mediator unit. The latter knows both the transmitting client unit and the receiver provider unit and can therefore store both the first connection information and the second connection information in the message. However, the respective transmitters during transmission or the respective receivers during reception can also likewise store the connection information in the message. In this case, a plurality of transmission steps to the receiver are possible, in particular.

In response to the message, a second message or a response message is advantageously transmitted from the receiver provider unit to the mediator unit and from the mediator unit to the transmitting client unit on the basis of the first and second connection information. This second message is expediently transmitted back to the mediator unit from the receiver provider unit according to the second connection information. In response to reception of this second message, the mediator unit transmits the second message back to the transmitting client unit according to the first connection information.

As explained above, each item of connection information is stored as a most significant connection information entry, in particular, on the outward journey. In the return direction, the most significant connection information entry is read during each transmission. The response is expediently transmitted with regard to this connection information which has been read, and the corresponding connection information is then expediently removed. A plurality of transmission steps to the receiver are therefore possible, in particular. It is conceivable, for example, for data to be on another device and for addresses to be shown in the address area of the mediating device.

The message and also, in particular, the second message or a response message each preferably comprise a first message part and a second message part. The message format of the messages interchanged between the client unit(s) and the mediator unit and the format of the second messages interchanged between the provider unit(s) and the mediator unit are therefore identical, in particular. The messages are therefore expediently subdivided into different message parts which can each serve different purposes, in particular in order to respectively store information of different categories therein. It goes without saying that each of these message parts can be subdivided per se into further message parts and can respectively comprise individual different entries. Each of these entries comprises, in particular, a length and data. The first and second message parts can be separated from one another, in particular, by a further, third message part.

The connection information is preferably stored in the first message part. An entry containing the corresponding connection information for the respective transmission is expediently added to the first message part each time the message is transmitted between two units of the control system.

An access path to data from the receiver provider unit, that is to say a data request, is preferably stored in the second message part. Corresponding information or routing information relating to the receiver provider unit to which the message is intended to be transmitted is therefore expediently already included in the message. The mediator unit can therefore forward the message to the correct receiver provider unit on the basis of the access paths registered or stored in the mediator unit.

Information relating to data to be transmitted is also preferably stored in the second message part. In this case, the information may expediently comprise data themselves which are intended to be transmitted to the receiver provider unit. Alternatively or additionally, the information may comprise, for example, a request to read in data from the receiver provider unit. Accordingly, these data can be stored in the second message part of the response message or of the second message from the receiver provider unit to the transmitting client unit. In particular, the second message part therefore relates to information relating to requests and/or responses. The second message part of the messages expediently respectively comprises a first entry relating to a header, for example for identifying the message, a second entry relating to the access path and a third entry in which the data are stored.

According to one advantageous embodiment, if the at least one provider unit is connected to the mediator unit, the at least one provider unit is registered by the mediator unit and access paths to data provided by the at least one provider unit are stored in the mediator unit. If connected to the mediator unit, the provider units register with the mediator unit for this purpose, in particular with their respective access paths. This registration can also be carried out dynamically, in particular, during the runtime of the control system. In particular, individual provider units can therefore be newly added to the control system or removed or replaced during the runtime.

The access paths are advantageously stored in the mediator unit in a database in a manner hierarchically structured in an object tree. Each object in this object tree is expediently uniquely described by one of the access paths. In particular, such an object tree is in the form of a system of different nodes. Each node can be connected to an expedient number of further nodes or sub-nodes. In particular, a superordinate object or a root node, at which the object tree begins, is provided.

A control system according to the disclosure of a machine comprises a mediator unit, at least one client unit and at least one provider unit and is configured, in particular in terms of programming, to carry out a method according to the disclosure.

The mediator unit, the at least one client unit and the at least one provider unit are preferably implemented in the same hardware unit. For example, these individual units can each be provided as software components which are each executed by the same hardware unit. Alternatively or additionally, the mediator, client and provider units may also each be in the form of individual hardware components of a superordinate hardware unit, for example individual components on a common circuit board.

Alternatively, it is preferably conceivable for at least two units selected from the mediator unit, the at least one client unit and the at least one provider unit to be implemented as different hardware units. All of these units can also be expediently respectively in the form of different hardware units, for example individual circuit boards in each case.

The disclosure is suitable for a wide range of applications, for example for tunnel boring machines, hydraulic stamping/pressing, general automation systems, semiconductor handling, robotics, etc. The disclosure is particularly suitable for controllers of machines. Such a machine may be, in particular, in the form of a machine tool, for example a welding system, a screwing system, a wire saw or a milling machine, or in the form of a web processing machine, for example a printing machine, a newspaper printing press, a gravure printing press, a screen printing machine, an in-line flexographic printing press or a packaging machine. Such a machine may also be in the form of a (conveyor) installation for producing an automobile or for producing components of an automobile (for example internal combustion engines or control devices).

The implementation of a method according to the disclosure in the form of a computer program or a computer program product with program code for carrying out all of the method steps is also advantageous since this gives rise to particularly low costs, in particular if an executing control device is also used for further tasks and is therefore present anyway. Suitable data storage media for providing the computer program are, in particular, magnetic, optical and electrical memories, for example hard disks, flash memories, EEPROMs, DVDs and many more. It is also possible to download a program via computer networks (Internet, intranet, etc.).

Further advantages and configurations of the disclosure emerge from the description and the accompanying drawing.

It goes without saying that the features mentioned above and the features yet to be explained below can be used not only in the respectively stated combination, but also in other combinations or alone, without departing from the scope of the present disclosure.

The disclosure is schematically illustrated in the drawing on the basis of exemplary embodiments and is described in detail below with reference to the drawing.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
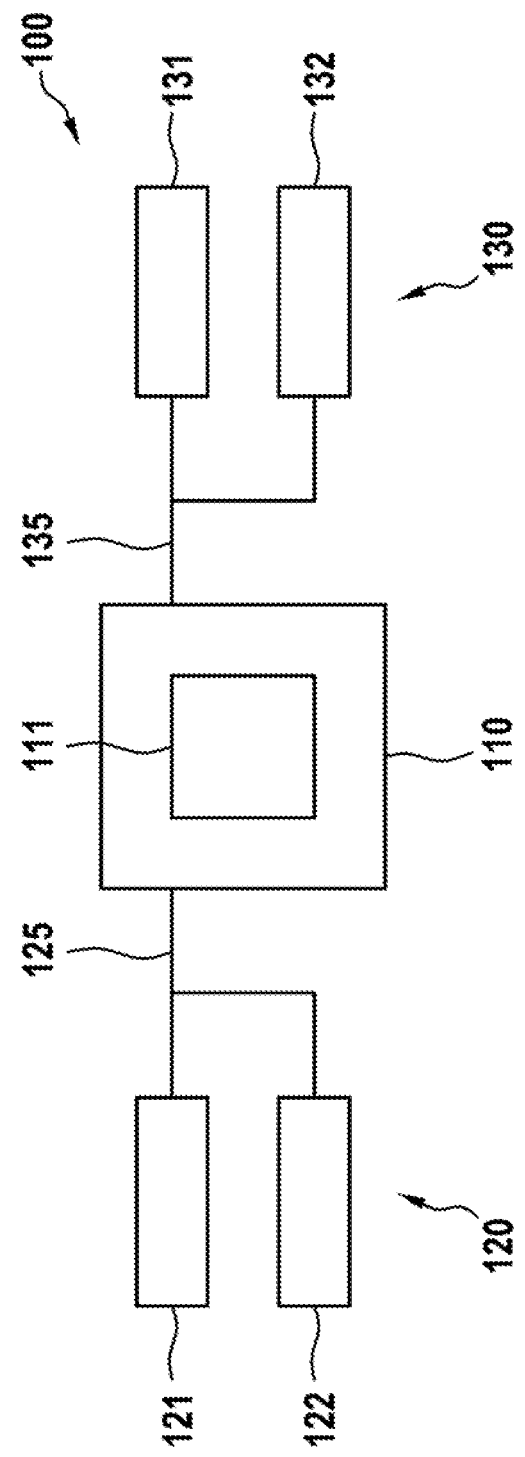
FIG. 1 schematically shows a preferred configuration of a control system according to the disclosure of a machine, which control system is configured to carry out a preferred embodiment of a method according to the disclosure.

A preferred configuration of a control system according to the disclosure of a machine is schematically illustrated in FIG. 1 and is denoted 100. For example, the control system 100 may be designed to control a web processing machine, in particular a printing machine.

The control system 100 comprises a mediator unit 110, at least one client unit 120 and at least one provider unit 130. Two client units 121 and 122 and two provider units 131 and 132 are illustrated, purely by way of example, in FIG. 1. It goes without saying that another expedient number of client and provider units may also be provided in each case.

The mediator unit is connected to the client units 120 in a data-transmitting manner via a first communication connection 125 and is connected to the provider units via a second communication connection 135. These communication connections 125, 135 may each be, for example, in the form of a bus system such as PCI or PCIe or, for example, in the form of a field bus such as CAN, Ethernet/IP, ProfiNet, Sercos 2, Sercos III, EtherCAT, FlexRay, LIN, MOST, etc. It goes without saying that the communication connections 125, 135 may also be wireless.

Data or machine-related data are stored in the provider units 130. These data describe a range of functions of the control system 100 and define, in particular, the functions of the control system 100 for controlling the machine.

One example of a provider unit 130 is a control unit (for example PLC) of a kinematic system, for example a robot or the like. Provided data relate, in particular, to parameters of the kinematic system, for example maximum speed, axes involved, movement limit values, etc., and desired and actual values such as position, speed, torque, etc. These data are registered in the mediator unit 110 by means of access paths and are hierarchically represented, in particular. These parameters can be read and written by a client unit 121, 122. Furthermore, actual values can be read and desired values can be written by a client unit 121, 122.

A further example of data to be transmitted relates to the commanding of (entire) movements. In this case, a consistent data packet from the provider unit, for example comprising target position, limit values, etc., is transmitted, for example. It is advantageous here that the data can be transmitted as a unit.

An "address book", generally referred to as table 111 below, is provided or stored in the mediator unit 110 and stores access paths to the data from the provider units 130. The individual data items can be uniquely addressed with the aid of these access paths.

The control system 100 therefore has a hierarchically distributed architecture comprising client units 120, mediator unit 110 and provider units 130. The mediator unit 110 is provided as a central management unit and is provided for the purpose of managing and mediating data transmissions between the client and provider units 120, 130. It is therefore possible, even during the runtime of the control system 100, to dynamically and flexibly access the machine-related data in the provider units 130, to introduce new data and to therefore expand the control system 100 with functionalities, to configure and operate it at the runtime.

Figure 2:
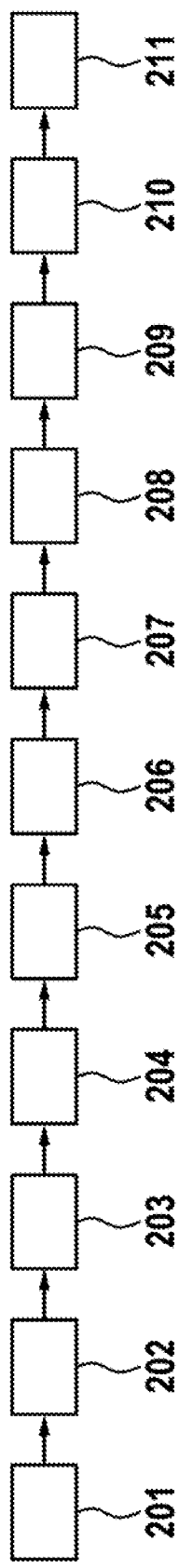
FIG. 2 schematically shows a preferred embodiment of a method according to the disclosure in the form of a block diagram.

For this purpose, the control system 100 is configured, in particular in terms of programming, to carry out a preferred embodiment of a method according to the disclosure which is schematically illustrated in the form of a block diagram in FIG. 2.

In step 201, the client units 120 are connected to the mediator unit 110 in a data-transmitting manner via the first communication connection 125, and, in step 202, the provider units 130 are connected to the mediator unit 110 in a data-transmitting manner via the second communication connection 135. It goes without saying that these steps can take place in any desired time sequence.

After the provider units 130 are connected to the mediator unit 110 in step 202, the provider units 130 are registered by the mediator unit 110 in step 203. In particular, the individual provider units 130 register with the mediator unit 110 for this purpose with the associated access paths to the provided data. The access paths are then stored in the table 111 in the mediator unit 110.

The client units 120 can now dynamically access the data stored in the provider units 130 during the runtime of the control system 100.

The example in which the client unit 121, as the transmitting client unit, would like to have access, here write access, to data from the provider unit 131, as the receiver provider unit, shall now be considered below.

For this purpose, the client unit 121, as the transmitting client unit, transmits a corresponding message to the mediator unit 110 in step 204.

Figure 3:
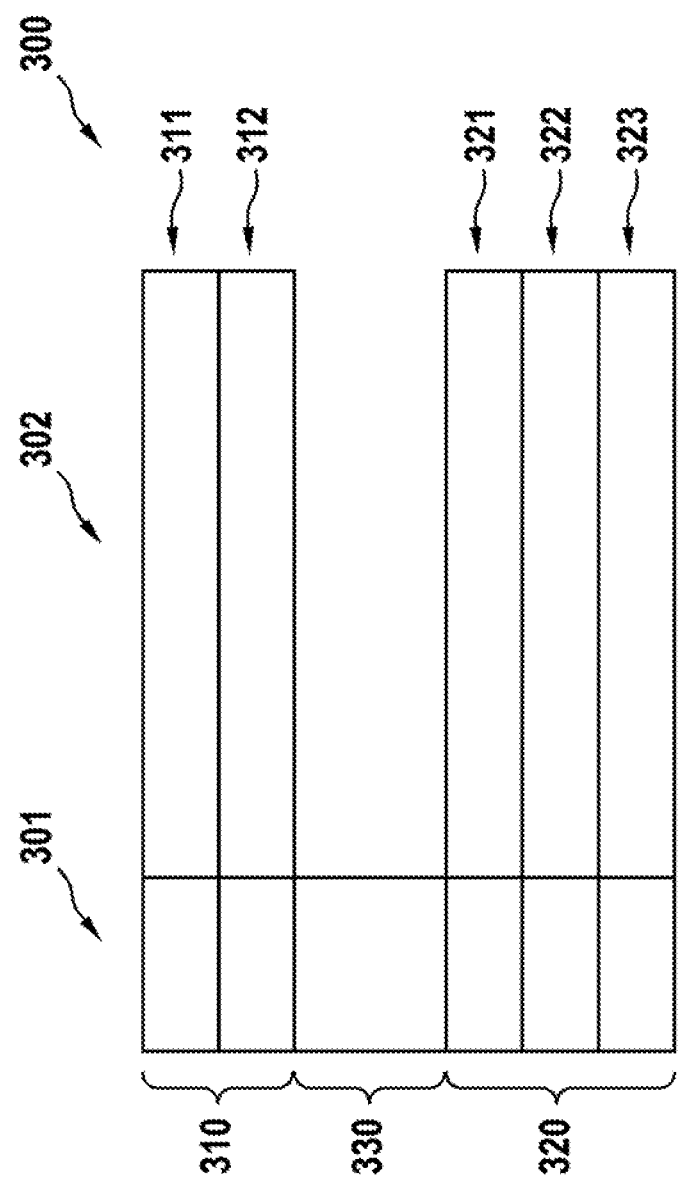
FIG. 3 schematically shows a message which can be transmitted in the course of a preferred embodiment of a method according to the disclosure.

Such a message is schematically illustrated in FIG. 3 in a form in which it arrives at the receiver provider unit and is denoted 300. This message comprises a multiplicity of individual entries each comprising a length 301 and data 302. Furthermore, these messages are each subdivided into a first message part 310 and a second message part 320 which are separated from one another by a third message part 330. In FIG. 3, the first message part 310 comprises, for example, two entries 311 and 312 and the second message part 320 comprises, for example, three entries 321, 322 and 323. The first message part 310 is preferably provided for routing or connection information and the second message part 320 is preferably provided for information relating to data, requests and responses to be transmitted.

The message transmitted from the transmitting client unit 121 to the mediator unit 110 in step 204 expediently comprises a header in the entry 321 of the second message part, the access path to the data from the receiver provider unit 131 in the entry 322 and the data which are intended to be introduced into the receiver provider unit 131, for example a desired value, in the entry 323.

After the mediator unit 110 has received this message, it stores first connection information relating to the connection between the transmitting client unit 121 and the mediator unit 110, for example an item of routing information such as the source and destination addresses, in the entry 312 of the first message part 310 in step 205.

In step 206, the mediator unit 110 reads in the access path stored in the entry 322 and determines, on the basis of the table 111, which connection should be used to transmit the message to the receiver provider unit 131. This connection is stored as second connection information in the entry 311. In step 207, the mediator unit 110 transmits the message to the receiver provider unit 131 via this connection.

In particular, the associated connection information is respectively created as the most significant entry in the first message part 310 during each transmission.

In step 208, the receiver provider unit 131 receives the message and accepts the data stored in entry 323.

In step 209, the receiver provider unit 131 generates, for example, a confirmation or feedback of an actual value as a second message or a response message.

In step 210, the receiver provider unit 131 transmits this response message according to the most significant entry 311 of the first message part 310, that is to say according to the second connection information relating to the respective connection back to the mediator unit 110, which second connection information is stored in entry 311.

After this transmission, the entry 311 is expediently deleted. The entry 312 is therefore now the most significant entry in the first message part 310.

In step 211, the mediator unit 110 then transmits the response message according to the first connection information relating to the corresponding connection back to the transmitting client unit 121, which first connection information is stored in entry 312.

What is claimed is:

1. A method for transmitting data in a control system of a machine, the control system having a mediator device, at least one client device, and at least one provider device, the mediator device being connected to the at least one client device and to the at least one provider device in a data-transmitting manner, the method comprising:
storing, in the mediator device, a table including a plurality of access paths that each describe a data connection from the mediator device to a corresponding provider device of the at least one provider device; and
transmitting data from a client device of the at least one client device to a provider device of the at least one provider device by (i) receiving, with the mediator device, a first message transmitted from the client device, the first message including one of the access paths as a first entry and data for the provider device as a second entry, (ii) storing, with the mediator device, first connection information as a third entry of the first message and second connection information as a fourth entry of the first message, the first connection information including an address of the client device, the second connection information including an address of the mediator device, (iii) reading the access path of the first message with the mediator device, (iv) using the table to determine which data connection is associated with the access path of the first message, and (v) transmitting the first message from the mediator device to the provider device using the determined data connection.

2. The method according to claim 1, the transmitting data further comprising:
transmitting, in response to the first message, a second message from the provider device to the mediator device and from the mediator device to the client device based on the first connection information and the second connection information.

3. The method according to claim 1, wherein:
the first message includes a first message part and a second message part,
the first message part includes a first plurality of the entries including the third entry and the fourth entry, and
the second message part includes a second plurality of entries including the first entry and the second entry.

4. The method according to claim 3, wherein information relating to data to be transmitted is included as a further entry in the second message part.

5. The method according to claim 1, further comprising:
registering the at least one provider device with the mediator device to build the table.

6. The method according to claim 1, the storing the table further comprising:
storing the access paths in the mediator device in a hierarchically structured object tree.

7. The method according to claim 1, wherein the method is carried out by executing a computer program on a computing device.

8. The method according to claim 7, wherein the computer program is stored on a non-transitory machine-readable storage medium.

9. The method according to claim 1, further comprising:
accepting the data for the provider device of the second entry of the first message with the provider device;
generating a second message using the provider device after accepting the data, the second message including (i) response data generated by the provider device, (ii) the first connection information of the first message, and (iii) the second connection information of the first message; and
transmitting the response data from the provider device to the client device by (i) transmitting, using the provider device, the second message to the mediator device using the address of the mediator device as included in the second connection information, and (ii) transmitting, using the mediator device, the second message to the client device using the address of the client device as included in the first connection information.

10. The method according to claim 9, further comprising:
deleting the second connection information using the mediator device after receiving the second message and before transmitting the second message to the client device.

11. A control system of a machine, the control system comprising:
at least one client device;
at least one provider device; and
a mediator device connected to the at least one client device and to the at least one provider device in a data-transmitting manner, the mediator device being configured to:
  store access paths to data stored in the at least one provider device; and
  facilitate transmission of data from a transmitting client device of the at least one client device to a receiver provider device of the at least one provider device by (i) receiving a first message transmitted from the transmitting client device and (ii) transmitting the first message to the receiver provider device based on the access paths stored in the mediator device,
wherein the mediator device, the at least one client device, and the at least one provider device are implemented in a same hardware device, and
wherein the mediator device, the at least one client device, and the at least one provider device are individual hardware components on a common circuit board.

\* \* \* \* \*